(12) United States Patent
Krueger et al.

(10) Patent No.: US 9,941,798 B2
(45) Date of Patent: Apr. 10, 2018

(54) SWITCHED-MODE POWER CONVERSION (71) Applicant: Infineon Technologies Austria AG, Villach (AT)

(72) Inventors: Martin Krueger, Oberschleissheim (DE); Marc Fahlenkamp, Geretsried (DE); Torsten Hinz, Augsburg (DE)

(73) Assignee: INFINEON TECHNOLOGIES AUSTRIA AG, Villach (AT)

( * ) Notice: Subject to any disclaimer, the term of this patent is extended or adjusted under 35 U.S.C. 154(b) by 324 days.

(21) Appl. No.: 14/612,586

(22) Filed: Feb. 3, 2015

(65) Prior Publication Data
US 2015/0236598 A1 Aug. 20, 2015

Related U.S. Application Data (60) Provisional application No. 61/940,100, filed on Feb. 14, 2014.

(51) Int. Cl.
*H02M 3/335* (2006.01)
*H02M 1/44* (2007.01)
*H02M 1/00* (2006.01)

(52) U.S. Cl.
CPC ......... *H02M 3/33507* (2013.01); *H02M 1/44* (2013.01); *H02M 3/33515* (2013.01); *H02M 2001/0058* (2013.01); *Y02B 70/1433* (2013.01); *Y02B 70/1491* (2013.01)

(58) Field of Classification Search
CPC ..... H02M 3/33507; H02M 2001/0032; H02M 3/33515; H02M 3/33523; H02M 2001/0058; Y02B 70/16; Y02B 70/1433; Y02B 70/1491
See application file for complete search history.

(56) References Cited

U.S. PATENT DOCUMENTS

| 8,238,123 | B2 | 8/2012 | Zhang et al. |
| 8,730,698 | B2 | 5/2014 | Duerbaum et al. |
| 2002/0085394 | A1 | 7/2002 | Giannopoulos et al. |
| 2003/0090254 | A1* | 5/2003 | Strijker ............ H02M 3/33515 323/283 |
| 2008/0310191 | A1 | 12/2008 | Zhu et al. |

(Continued)

FOREIGN PATENT DOCUMENTS

CN 101645655 A 2/2010
CN 102118107 A 7/2011

*Primary Examiner* — Henry Lee, III
(74) *Attorney, Agent, or Firm* — Slater Matsil, LLP (57) ABSTRACT

In accordance with an embodiment, a method of operating a switched-mode power converter includes defining at least one of a minimum switching frequency threshold and a maximum switching frequency threshold; detecting valleys occurring in a voltage over the switching element when the switching element is in an off-state; and either in a quasi-resonant mode, switching the switching element on when an nth consecutive valley occurs, n being an integer equal to or greater than one, so that the actual switching frequency is at least one of: below the maximum switching frequency threshold and above the minimum switching frequency threshold, or in a forced switching frequency mode, switching the switching element on so that the actual switching frequency is the maximum or the minimum switching frequency.

30 Claims, 4 Drawing Sheets

(56) References Cited

U.S. PATENT DOCUMENTS

| | | | |
|---|---|---|---|
| 2010/0219802 A1* | 9/2010 | Lin | H02M 3/33507 323/284 |
| 2011/0018515 A1* | 1/2011 | McCloy-Stevens | H02M 3/1588 323/284 |
| 2011/0305053 A1* | 12/2011 | Lin | H02M 1/44 363/95 |
| 2013/0027985 A1 | 1/2013 | Wang et al. | |
| 2014/0140116 A1* | 5/2014 | Portisch | H02M 1/44 363/97 |
| 2014/0253081 A1* | 9/2014 | Duncan | G05F 1/10 323/284 |
| 2015/0062981 A1* | 3/2015 | Fang | H02M 3/33507 363/21.17 |

\* cited by examiner

SWITCHED-MODE POWER CONVERSION

This application claims the benefit of U.S. Provisional Application No. 61/940,100, filed on Feb. 14, 2014, which application is hereby incorporated herein by reference in its entirety.

TECHNICAL FIELD

The disclosure relates to a switched-mode power converter, a method configured to operate a switched-mode power converter, and a computer-readable storage device storing computer-executable instructions that, in response to execution, cause a switched-mode power converter comprising a processor to perform operations.

BACKGROUND

Each time a switch, such as a transistor, is turned on or off in switched-mode power converter, energy is dissipated in proportion to the current and voltage being switched. The power losses associated with switch operations, referred to as switching losses, represent a significant source of power dissipation and therefore a significant source of inefficiency in conventional switch mode power converters. In addition to increasing switching loss, large rates of change for voltages and/or currents (i.e., dv/dt and/or di/dt) at the time of switch transition increase stress on the switch and the amount of electromagnetic interference (EMI) produced by the switch. Some switching schemes have been developed that take advantage of resonance in switch-mode power converters to turn on switches at times when the voltages applied to the switches are at a local minimum, referred to as a valley. Such switching schemes are therefore typically referred to as valley-mode switching schemes.

SUMMARY

A method configured to operate a switched-mode power converter, in which the power converter is operable to convert an input voltage into an output voltage at a variable switching frequency of a switching element in the power converter comprises: defining at least one of a minimum switching frequency threshold and a maximum switching frequency threshold; detecting valleys occurring in a voltage over the switching element when the switching element is in an off-state; and either in a quasi-resonant mode, switching the switching element on when an nth consecutive valley occurs, n being an integer equal to or greater than one, so that the actual switching frequency is at least one of: below the maximum switching frequency threshold and above the minimum switching frequency threshold, or in a forced switching frequency mode, switching the switching element on so that the actual switching frequency is the maximum or the minimum switching frequency.

A switched-mode power converter, which is operable to convert an input voltage into an output voltage, comprises: a controllable switching element configured to operate at a variable switching frequency; and a switch control unit configured to control the switching element; the switch control unit further configured to: receive at least one of a defined minimum switching frequency threshold and a defined maximum switching frequency threshold; detect valleys occurring in a voltage over the switching element when the switching element is in an off-state; and either in a quasi-resonant mode, switch the switching element on when an nth consecutive valley occurs, n being an integer equal to or greater than one, so that the actual switching frequency is at least one of: below the maximum switching frequency threshold and above the minimum switching frequency threshold, or in a forced switching frequency mode, switch the switching element on so that the actual switching frequency is the maximum or the minimum switching frequency.

A computer-readable storage device stores computer-executable instructions that, in response to execution, cause a processing component to: store at least one of a minimum switching frequency threshold and a maximum switching frequency threshold; detect valleys occurring in a voltage over the switching element when the switching element is in an off-state; and either in quasi-resonant mode, switch the switching element on when an nth consecutive valley occurs, n being an integer equal to or greater than one, so that the actual switching frequency is at least one of: below the maximum switching frequency threshold and above the minimum switching frequency threshold, or in a forced switching frequency mode, switch the switching element on so that the actual switching frequency is the maximum or the minimum switching frequency.

Other converters, methods, software, features and advantages will be, or will become, apparent to one with skill in the art upon examination of the following figures and detailed description. It is intended that all such additional converters, methods, programs, features and advantages be included within this description, be within the scope of the invention, and be protected by the following claims.

BRIEF DESCRIPTION OF THE DRAWINGS

The system may be better understood with reference to the following drawings and description. In the figures, like referenced numerals designate corresponding parts throughout the different views.

DETAILED DESCRIPTION OF ILLUSTRATIVE EMBODIMENTS

Figure 1:
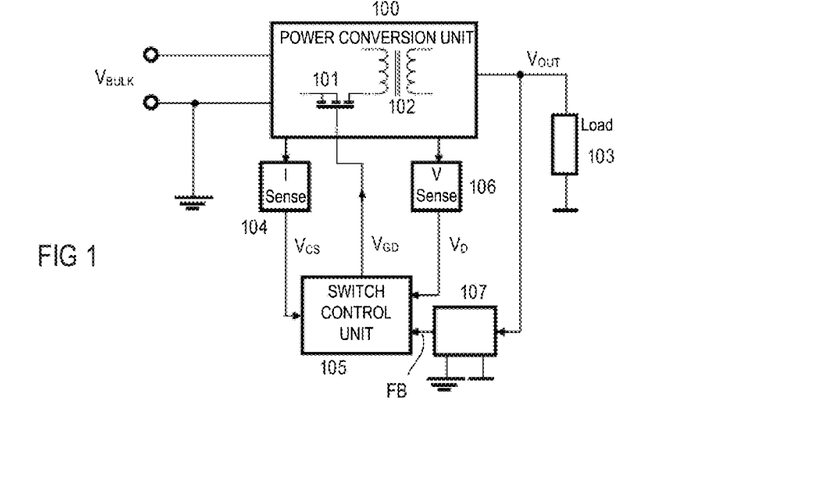
FIG. 1 is circuit diagram illustrating a first exemplary switched-mode power converter.

Referring to FIG. 1, an exemplary switched-mode power converter may include a power conversion unit 100, e.g., a DC-DC flyback converter, with a switching element 101, a magnetic element such as a transformer 102, and other parts (not shown) such as rectifiers, capacitors etc. The power conversion unit 100 has an input which is supplied with a DC voltage, bulk voltage $V_{BULK}$, and an output which supplies an output voltage $V_{OUT}$ to a load 103. Switching element 101 may be a semiconductor switch, such as metal oxide semiconductor field-effect transistor (MOSFET), an insulated gate bipolar transistor (IGBT) or the like, which is configured to connect the transformer to voltage $V_{BULK}$ in accordance with a respective control signal. The switched-mode power converter may further include a current sense module 104 that provides a current sense signal, e.g., a (primary) current sense voltage $V_{CS}$, representing the current flowing through a primary winding of transformer 102. A switch control unit 105 is configured to generate a control signal $V_{GD}$ supplied to the switching element 103 for switching the switching element 101 on (conducting) and off (non-conducting) according to the control signal $V_{GD}$. If the switching element 101 is a MOSFET or an IGBT, the control signal $V_{GD}$ may be applied to the gate thereof.

Switch control unit 105 is configured to control the switching operation of the power conversion unit 100. In the following examples, the switch control unit 105 is configured to control the power conversion unit 100 to operate at least under certain circumstances in a quasi-resonant mode, i.e., self-oscillating mode. The control unit 10 may further be configured to compare the current sense voltage VCS with a reference voltage. The control signal VGD is set to switch off a primary current flowing into transformer 102 when the current sense signal VCS equals or exceeds the reference voltage. In quasi-resonant mode, switching element 101 may be switched on when the voltage across the switching element 101 is at a (local) minimum, also known as voltage valley or valley. To achieve this, the switched-mode power converter may comprise a voltage sense module 106 for directly or indirectly monitoring the voltage drop VD across the switching element 101 during the off-time of switching element 101 in order to allow detecting of the time instant when the voltage is at the minimum (valley). A feedback path 107 from the switched-mode power converter output (i.e., from the output a power conversion unit 100) to switch control unit 105 may provide an additional input signal, a feedback signal FB, to the switch control unit 105. The feedback path 107 may include basic signal processing (e.g., PI or PID regulation) and galvanic isolation (e.g., by way of opto-electronic couplers etc.).

Switching at the valleys minimizes switching losses and electromagnetic emissions (EMI). Commonly, a fixed (constant) valley of a number of valleys in a row, e.g., the first, second or any other valley, is used as a trigger for controlling the switching element 101 to switch on. The switching frequency of the switched-mode power converter, when in quasi-resonant mode, corresponds to the load 103 and, thus, may widely vary. However, high switching frequencies (at low loads) increase switching losses and electromagnetic emissions. Low switching frequencies (at high loads) may be unpleasant to a user when they overlap the audible frequency range. Restricting the switching frequency range limits the applicability of the power converter.

Figure 2:
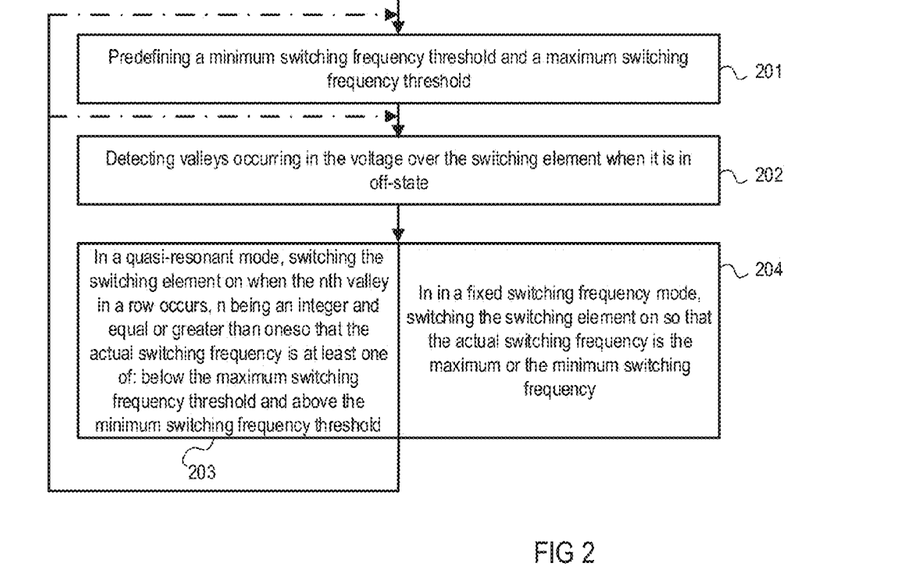
FIG. 2 is a flow chart illustrating an exemplary method of operating a switched-mode power converter.

Referring to FIG. 2, an exemplary method of operating a switched-mode power converter may include the following procedures, which may be implemented in hardware, software or any combination thereof. Initially, a minimum switching-frequency threshold and a maximum switching-frequency threshold are predefined (201). The thresholds may be constant or variable, e.g., change with feedback signal. Then, valleys may occur in the voltage over the switching element when it is in off-state, are detected (202). The valleys, which may be detected, for example, by dedicated hardware or software detectors or may be calculated from other parameters such as zero-crossing events and resonant frequencies.

In quasi-resonant operating mode, the switching element is switched on when the nth valley in a row occurs, whereas n is an integer and equal or greater than one (203). In forced frequency mode, the switching element is switched on for a switching time period $T_{SW}=1/f_{SW}$ after the last turn on (204). The actual switching frequency is $f_{SW}$. In one case the actual switching frequency $f_{SW}$ is equal to the maximum switching frequency. In another case the actual switching frequency $f_{SW}$ is equal to the minimum switching frequency. In accordance with the load and line conditions, the best operating mode is chosen. For example, at a lower load a forced frequency operation mode in a lower switching frequency range may be suitable. Here, the maximum frequency may be set to lower values and the controller may switch at the lower maximum frequency. At a higher load a quasi-resonant operation mode in a higher switching frequency range may be more suitable. The valley number n may be chosen so to keep the actual switching frequency below the maximum switching frequency threshold. In, however, most cases the valley number n may be chosen to keep the switching frequency above the minimum switching frequency threshold.

To achieve such a quasi-resonant operation an example algorithm is given below. The actual switching frequency of the switching element is compared to the minimum switching frequency threshold and the maximum switching frequency threshold to the effect that n is decreased by one if the actual frequency is equal to or smaller than the minimum switching frequency threshold or n is increased by one if the actual frequency is equal to or greater than maximum switching frequency threshold.

Figure 3:
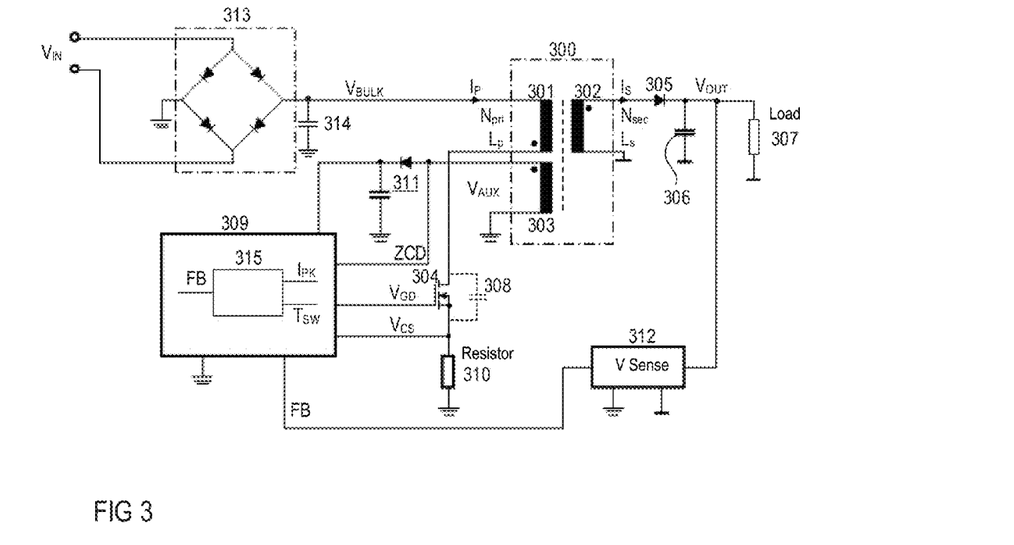
FIG. 3 is a circuit diagram illustrating a second exemplary switched-mode power converter.
Figure 4:
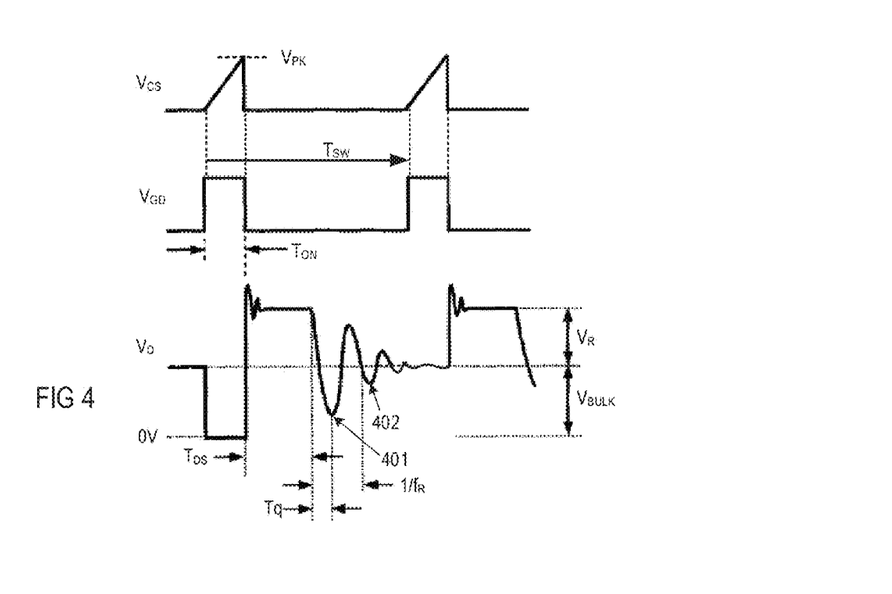
FIG. 4 is a diagram illustrating input and output signals of a switch control unit in the exemplary switched-mode power converter shown in FIG. 3.

FIG. 3 depicts another exemplary switched-mode power converter (e.g., a pulse width modulated flyback converter) in which a switching device 304 is operable to connect a transformer 300 to a DC input voltage, bulk voltage $V_{BULK}$, and to control the power delivered from a primary winding 301 to the secondary winding 302 of transformer 300. Energy is stored in the transformer 300 when the switching device 304 is turned on. When the switching device 304 is switched off, the energy of the transformer 300 is discharged to a capacitor 306 and to a load 307 at the output of the power converter through a rectifier 305 so that an output voltage $V_{OUT}$ appears at the load 307. As shown in FIG. 4, a reflected voltage $V_R$ is generated at this time in the primary winding 301 of transformer 300 in accordance with the output voltage $V_{OUT}$ and the turn-ratio of the transformer 300. Therefore, a voltage $V_D$ across to the switching device 304 is equal to the bulk voltage $V_{BULK}$ plus the reflected voltage $V_R$ once the switching device 304 is turned off. The energy corresponding to the voltage $V_D$ is stored in a parasitic capacitor 308 of the switching device 304. After a discharge period $T_{DS}$, the energy of the transformer 300 is fully discharged, the energy stored in the parasitic capacitor 308 flows back to the bulk voltage $V_{BULK}$ through the primary winding 301 of the transformer 300. Capacitance 308, which represents all applicable parasitic capacitance C, like drain-source capacitance of switching device 304 or winding capacitance of transformer 300, and the inductance $L_P$ of the primary winding 301 develop a resonant tank, whose resonant frequency $f_R$ can be described as equation (1a):

$$f_R = \frac{1}{2\pi\sqrt{L_P \cdot C_j}}. \tag{1a}$$

During the resonant period, the energy of the parasitic capacitor 308 is delivered back and forth from and to the inductance provided by primary winding 301. Discharging of the parasitic capacitor 308 to a (first) valley voltage 401 (followed by subsequent valleys 402 etc.) occurred on voltage $V_D$ takes places during a delay time $T_q$. The delay time $T_q$ is one half of the period of the quasi-resonant and can be expressed as equation (1b):

$$T_q = \frac{1}{2 \cdot f_R}. \quad (1b)$$

If the switching device 304 is turned on during the valley voltage 401 across the switching device 308, switching loss and EMI can be decreased.

A switching control circuit 309 receives a feedback signal FB, a current sense signal $V_{CS}$ (e.g., a voltage representing the current) and a zero-crossing detection signal ZCD, and provides an output signal $V_{GD}$ (e.g., a voltage). The output signal $V_{GD}$ is for driving the switching device 304 such as a MOSFET. The switching device 304 is further coupled to the transformer 300 to generate a switching current signal on a current-sense resistor 310 that transforms a primary current $I_P$ flowing through primary winding 301 into the voltage $V_{CS}$ that forms current sense signal. The transformer 300 includes, beside primary winding 301 and secondary winding 302, an auxiliary winding 303 with an inductance $L_A$. The primary winding 301 is connected to the bulk voltage through switching device 302 and the secondary winding 302 provides the output voltage of the power converter through rectifier 305. The auxiliary winding 303 provides the zero-crossing detection signal ZCD to the switching control circuit 309 and may provide, through a rectifier arrangement 311, a supply voltage to the switching control circuit 309. An output voltage sense unit 312 is equipped (e.g., with an optical coupler and PI or PID regulator) to generate the galvanically isolated feedback signal FB. Thus, the input of the output voltage sense unit 312 is coupled to the output of the power converter and its output is coupled to the respective input of switching control circuit 309 to generate the switch control signal $V_{GD}$ for regulating the output voltage $V_{OUT}$ of the power converter.

As further shown in FIG. 3, the DC bulk voltage $V_{BULK}$ may be derived from an AC input voltage $V_{IN}$ by way of a bridge rectifier 313 and a smoothing capacitor 314. Input of switching control circuit 309 may include a frequency law module 315 that generates from the feedback signal FB a peak current threshold $I_{PK}$ and a switching time signal representing the switching time period $T_{SW}$ or the switching time period thresholds $T_{SWmin}$ and $T_{SWmax}$:

$$T_{SWmin} = \frac{1}{f_{SWmax}} \quad (2a)$$

$$T_{SWmax} = \frac{1}{f_{SWmin}} \quad (2b)$$

As can be seen from FIG. 4, the current sense signal $V_{CS}$, which is representative of the primary current $I_P$, increases during the time period $T_{ON}$ in which the switching element 304 is switched on until the peak current threshold $I_{PK}$ is reached and switching element 304 is switched off until the next switch on. The time period between rising edges of successive on-time periods $T_{ON}$ is referred to as switching time period $T_{SW}$. Frequency law module 315 may include a look-up table or a calculation module to generate the peak current threshold $I_{PK}$ and switching time period $T_{SW}$ from feedback signal FB.

Accordingly, a voltage $V_{AUX}$ across the auxiliary winding 303 in the power converter shown in FIG. 3, a transformer current $I_L$ (i.e., primary current $I_P$ and secondary current $I_S$) and the output signal $V_{GD}$ of switch control unit 304 behave as follows: The signal curves between a time instant $t_1$ and a time instant $t_5$ when the switching element 304 is switched on again after it has been switched off at a time instant $t_2$, are continuously repeated during operation. At time instant $t_1$, switching element 304 is switched on and the primary current $I_P$ starts ramping up until a maximum current (peak current threshold $I_{PK}$) is reached at time instant $t_2$, when switching element 304 is switched off again. As a result, primary current $I_P$ quickly drops to zero, while a secondary current $I_S$, flowing through the secondary winding 302, steeply rises to its maximum value and then ramps down until it reaches zero at a time instant $t_4$. While switching element 304 is switched on between time instants $t_1$ and $t_2$, the voltage $V_{AUX}$ across the auxiliary winding 303 is almost zero. When switching element 304 is switched off at time instant $t_2$, the voltage $V_{AUX}$ steeply rises to a maximum voltage. Some ringing of the voltage $V_{AUX}$ may be observed between time instants $t_2$ and $t_3$ (i.e., during a settling time) and between time instants $t_3$ and $t_4$. When the secondary current $I_S$ has dropped to zero, the voltage $V_{AUX}$ drops to a value $V_{AUX}(t_4)$ that can be described with equation 3:

$$V_{AUX}(t_4) = V_{OUT} \cdot \frac{N_{AUX}}{N_{SEC}}, \quad (3)$$

in which $$V_{OUT} = L_S \cdot \frac{dI_S}{dt}, \quad (4)$$

$N_{AUX}$ is the number of turns of the auxiliary winding 303, $N_{SEC}$ is the number of turns of the secondary winding 302 and $L_S$ is the inductance of the secondary winding 302.

Accordingly, the drop of the voltage $V_{AUX}$ to a value $V_{AUX}(t_2)$ at time instant $t_2$ can be described with equation 5:

$$V_{AUX}(t_2) = V_{BULK} \cdot \frac{N_{AUX}}{N_{PRI}}, \quad (5)$$

in which $$V_{BULK} = L_P \cdot \frac{dI_P}{dt}, \quad (6)$$

$N_{PRI}$ is the number of turns of the primary winding 301, LP is the inductance of the primary winding 301 and the maximum primary current $I_{Pmax}$ is equal to the maximum transformer current $I_{LPK}$.

In the time interval between time instants $t_4$ and $t_5$, voltage $V_{AUX}$ rings again. When operating in a quasi-resonant mode, the switching element 304 is switched on again when the voltage $V_{AUX}$ reaches a certain one of a number of (local) minimums, valleys 501-504, which in the present example is at time instant $t_5$. At time instant $t_5$ the cycle starts over again. In the following, the time interval between $t_1$ and $t_2$ is referred to as the on-time $T_{ON}$, the time interval between $t_2$ and $t_4$ is referred to as off-time $T_{OFF}$ and the time interval between $t_4$ and $t_5$ is referred to as wait time $T_W$. On-time $T_{ON}$, off-time $T_{OFF}$ and wait time $T_W$ can be described with equations 7-9:

$$T_{ON} = L_P \cdot \frac{I_{LPK}}{V_{BULK}}, \tag{7}$$

$$T_{OFF} = L_P \cdot \frac{I_{LPK}}{V_R}, \tag{8}$$

$$T_W = \left(n - \frac{1}{2}\right) \cdot \frac{1}{f_R} \text{ with } n = 1, 2, 3 \ldots \tag{9}$$

in which $f_R$ is the resonant frequency in the quasi-resonant mode (see equation 1) and n is the number of the valley in a row starting with 1, and $$T_{SW} = T_{ON} + T_{OFF} + T_W = \frac{1}{f_{SW}}, \tag{10}$$

in which $f_{SW}$ is the switch frequency of switching element 304. The resulting primary power $P_P$ is according to equation 11:

$$P_P = \frac{1}{2} \cdot L_P \cdot I_{LPK}^2 \cdot f_{SW}. \tag{11}$$

The zero crossing signal ZCD may not only provide the zero crossings of the auxiliary voltage $V_{AUX}$ but can also form basis for the calculation of the bulk voltage $V_{BULK}$ and the output voltage $V_{OUT}$. However, other ways to determine those parameters are applicable as well.

Figure 5:
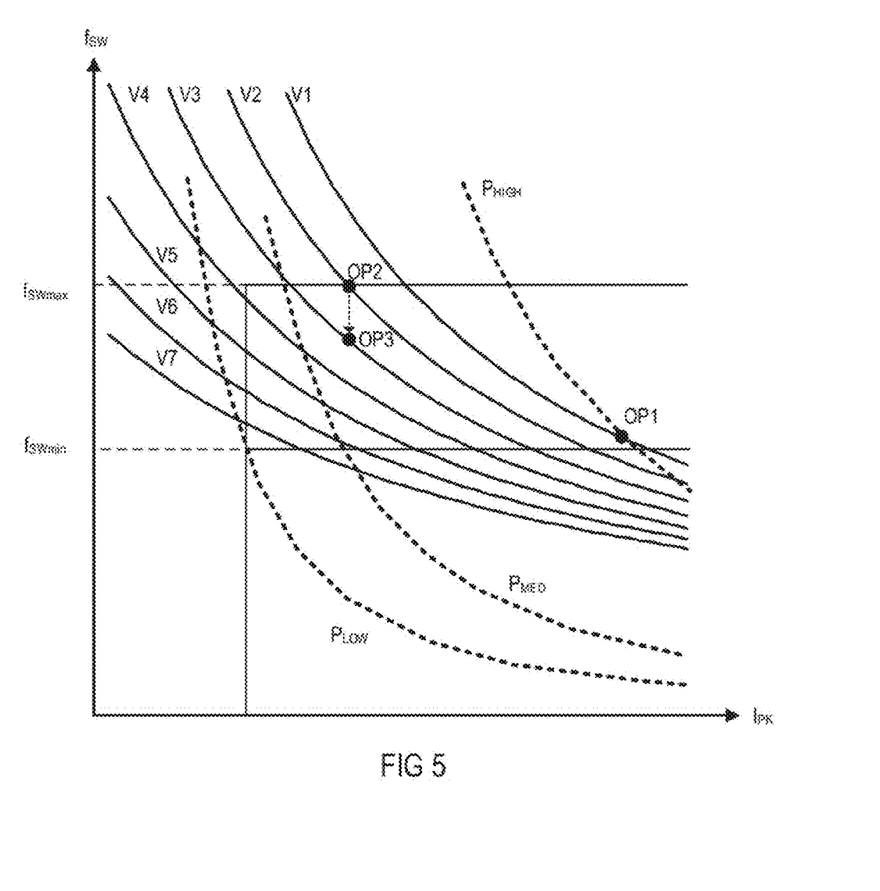
FIG. 5 is a diagram illustrating load dependent valley switching in the exemplary switched-mode power converter shown in FIG. 3.

FIG. 5 is a diagram showing the switching frequency $f_{SW}$ over maximum transformer current $I_{LPK}$ at low power output $P_{LOW}$, medium power output $P_{MED}$ and high power output $P_{HIGH}$. The curves for the specific power outputs can be derived from equation 11 to rewrite as equation 12:

$$f_{SW} = \frac{2 P_P}{L_P \cdot I_{LPK}^2}. \tag{12}$$

The curves for the low power output $P_{LOW}$, medium power output $P_{MED}$ and high power output $P_{HIGH}$ intersect with the curves representing valleys V1-V7. It is assumed that the converter is operated at high power $P_{HIGH}$ and valley V1, i.e., at an operating point OP1. When the power decreases, the power curve moves towards smaller $I_{LPK}$ values as indicated, for example, with the curves for low power output $P_{LOW}$ and medium power output $P_{MED}$, and, consequently, operating point OP1 moving along the curve of valley V1 to higher switching frequencies $f_{SW}$. However, the higher switching the frequencies $f_{SW}$ are, the higher the undesired power losses of the power converter will be. In contrast, if the power output rises, the switching frequency $f_{SW}$ decreases and may overlap the audible frequency range, i.e., undesired acoustic noise may be generated. Therefore, the frequency range is limited in the present example to an appropriate range between a maximum switching frequency $f_{SWmax}$ and a minimum switching frequency $f_{SWmin}$. A fixed valley as commonly used may result in an operating point OP1 that is outside of the limited switching frequency range, which means that the power converter will simply not be able to deliver the requested power. Therefore, the present power converter is operated to switch to a valley with a higher number n (e.g., from V1 to V2 or V3, etc.) if the actual frequency is equal to or greater than the maximum switching frequency threshold at frequency $f_{SWmax}$ and to a valley with a smaller number n (e.g., from V3 to V2, etc.) if the actual frequency is equal to or smaller than the minimum switching frequency threshold at frequency $f_{SWmin}$ in order to keep the operating point within the desired frequency range. The desired predetermined frequency range may be fixed or may be adaptable depending on certain parameters. As can be seen from FIG. 5, the operating point may move from its position OP1 to a position OP2 at the maximum switching frequency $f_{SWmax}$, where it switches from valley V1 to the valley V3 with an operating point OP3. The switching frequency $f_{SW}$ at an operating point on a valley curve Vn (n=1, 2, 3 . . . ) can be described as equation 13:

$$\frac{1}{f_{SW}} = L_P \cdot I_{LPK} \cdot \left(\frac{1}{V_{BULK}} + \frac{1}{V_R}\right) + \left(n - \frac{1}{2}\right) \cdot \frac{1}{f_R}. \tag{13}$$

The switched-mode power converter shown in FIG. 3 may be a multi-mode switching power converter. Multi-mode means that the control circuit 309 may be configured to operate in different modes, such as quasi-resonant mode (QR-n) at high loads, forced frequency discontinuous mode (DCM1,2) at medium loads and burst mode (BM) at very low loads. In the diagram shown in FIG. 5, which refers to quasi-resonant mode, operating points below a certain maximum transformer current $I_{LPL}$ cause the converter to switch to another mode of operation as can be seen in greater detail in FIG. 6.

Figure 6:
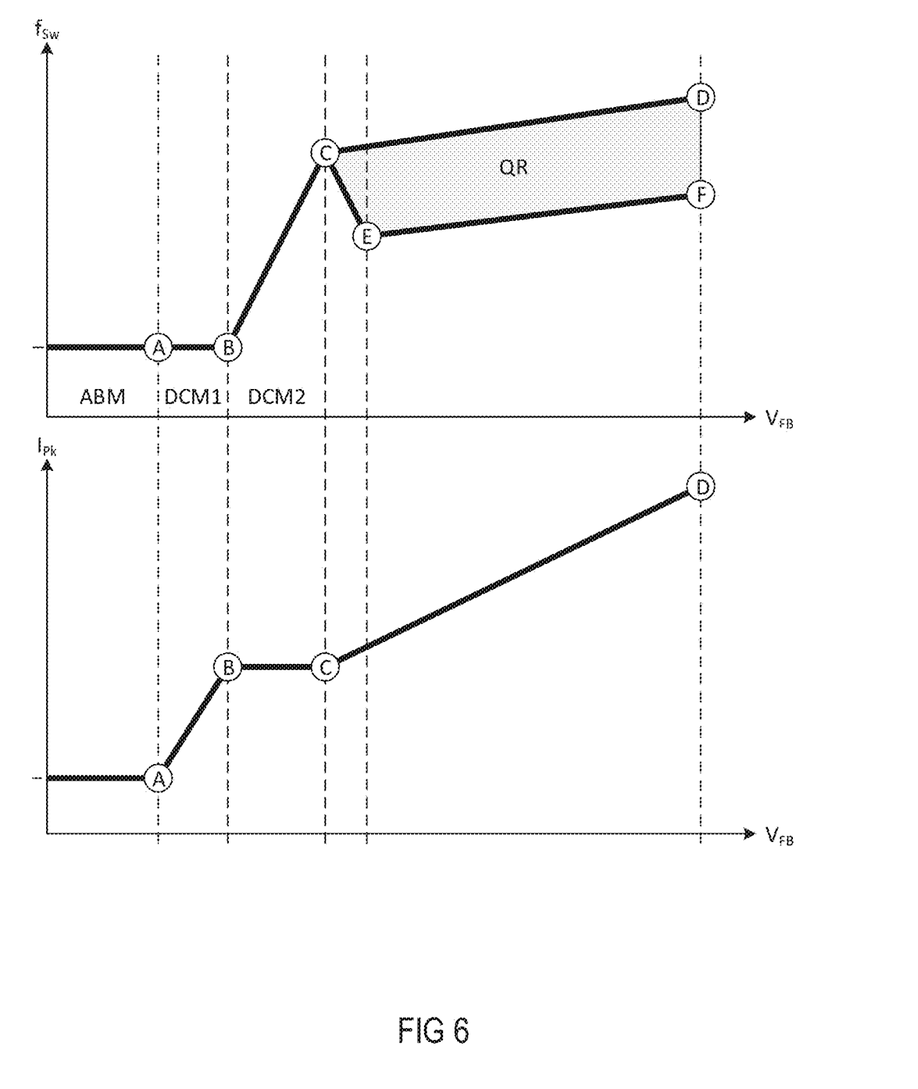
FIG. 6 is a diagram illustrating operation mode switching in the exemplary switched-mode power converter shown in FIG. 3.

FIG. 6 depicts in its upper diagram the switching frequency behavior of the converter shown in FIG. 3, i.e., its switching frequency $f_{SW}$ or switching frequency thresholds over feedback voltage $V_{FB}$ (representing feedback signal FB) for various modes such as active burst mode ABM, discontinuous mode DCM1 with variable peak current $I_{pk}$ and fixed constant frequency, discontinuous mode DCM2 with constant peak current $I_{pk}$ and forced variable frequency, and quasi-resonant mode QR-n with n-th valley switching. The bottom diagram of FIG. 6 illustrates the peak current $I_{pk}$ over feedback voltage $V_{FB}$.

The multi-mode operation is illustrated below in connection with the frequency scheme shown in FIG. 7. As can be seen from equations (11) to (13), selection of a mode depends on the load condition and the bulk voltage $V_{BULK}$. The peak current may be set, for example, by way of a respective current sense signal (not shown) in switch control unit 309. The switching frequencies per mode (except burst mode) may be as follows.

Between set points A and B, the switching frequency $f_{SW}$ is constant; the frequency curve is only a horizontal line.

Between set points B and C, the switching frequency $f_{SW}$ is forced but not constant. It is directly given by the feedback voltage as can be seen by the increasing line between B and C which is given either by the minimum switching frequency curve between set points B and C, or the maximum switching frequency curve between set points B and C.

Depending on the bulk voltage $V_{BULK}$ and the system dimensioning, DCM operation or QR operation may take place.

In QR-n mode, the switching frequency is between the QR maximum switching frequency curve from set point C to set point D and the minimum switching frequency limitation curve from set point E to set point F. The switching frequency $f_{SW}$ is here a function of the peak-current as represented by voltage $V_{CS}$, selected valley n, and bulk voltage $V_{BULK}$. Thus, in the QR-n mode (n=1, 2, 3 ...) the upper and bottom limits are not constant as they are in the example shown in FIG. 6.

The switch control unit 309 selects the operating mode from modes ABM, DCM1, DCM2, or QR-n and, additionally, in case of QR-n operation the valley number n that is suitable to fulfill the requirements.

The burst mode ABM is entered under light load conditions to also drive a flat efficiency curve down to "no load". The transition mode DCM2 is the phase between the operation in discontinuous current mode DCM1 and the operation in quasi-resonant mode QR-n. In quasi-resonant mode QR-n with skipping of zero crossings, the power converter operates between the maximum frequency limitation curve C-D-E and the minimum frequency limitation curve C-E-F shown in FIG. 6. Valley switching takes place in QR-n depending on the valley number n. Zero crossing signal ZCD is compared to an internal threshold to generate a trigger signal for switching on the switching element 304. This trigger signal may be delayed by means of an integrated propagation delay that can be configured to support the switch-on of switching element 304 in the minimum of the ringing valley.

The switch-on of the switching element 304 is determined in this mode by means of zero crossing detection based on signal ZCD. Zero crossings start to occur once the transformer 100 is demagnetized after the switching element 304 is switched-off. The next switch-on is released once the number of the counted zero crossings matches the number that, for example, an up/down counter for the valley number n has stored. The counter counts one up when the maximum frequency limitation curve is exceeded and counts one down when the minimum frequency limitation curve is exceeded. The immediate change of the up/down counter supports a low dynamic voltage drop. The maximum number of the up/down counter is given by the configurable parameter, i.e., valley number n.

The switching frequency of each switching cycle can be clamped to the upper switching frequency threshold if the selected valley switching operation leads to a higher switching frequency than the upper switching frequency threshold. Similarly, the switching frequency of each switching cycle can be clamped to the lower switching frequency threshold if the selected valley switching operation leads to a lower switching frequency than the upper switching frequency threshold.

While various embodiments of the invention have been described, it will be apparent to those of ordinary skill in the art that many more embodiments and implementations are possible within the scope of the invention. Accordingly, the invention is not to be restricted except in light of the attached claims and their equivalents.

In one or more examples, the functions described herein may be implemented at least partially in hardware such as specific hardware components or a processor. More generally, the techniques may be implemented in hardware, processors, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium, i.e., a computer-readable transmission medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used herein, includes compact disc (CD), laser disc, optical disc, digital versatile disc (DVD), floppy disk and blue-ray disc where disks usually reproduce data magnetically, while discs reproduce data optically with lasers. Combinations of the above should also be included within the scope of computer-readable media.

Instructions may be executed by one or more processors, such as one or more central processing units (CPU), digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structures or any other structure suitable for implementation of the techniques described herein. In addition, in some aspects the functionality described herein may be provided within dedicated hardware and/or software modules configured for encoding and decoding or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules or units are described in this disclosure to emphasize functional aspects of devices configured to perform the disclosed techniques, but do not necessarily require realization by different hardware units. Rather, as described above, various units may be combined in a single hardware unit or provided by a collection of interoperative hardware units, including one or more processors as described above, in conjunction with suitable software and/or firmware.

What is claimed is:

1. A method configured to operate a switched-mode power converter, in which the power converter is operable to convert an input voltage and a primary current into an output voltage and a secondary current at a switching frequency of a switching element in the power converter; the method comprising:
   defining at least one of a minimum switching frequency threshold and a maximum switching frequency threshold;
   detecting valleys occurring in a voltage over the switching element when the switching element is in an off-state;
   generating from a signal representing the output voltage of the power converter a peak current threshold and a switching time signal representing a switching time period using a look-up table; and
   controlling the switching element based on the detected valleys, the peak current threshold and the switching time signal to either
      in a quasi-resonant mode, switch the switching element on when an nth consecutive valley occurs, n being an integer equal to or greater than one, and to switch the switching element off when the peak current threshold is reached by the primary current of the power converter so that the switching frequency is at least one of: below the maximum switching frequency threshold and above the minimum switching frequency threshold; or
      in a forced switching frequency mode, switch the switching element on for the switching time period so that the switching frequency is the maximum or the minimum switching frequency.

2. The method of claim 1, wherein the at least one of the minimum switching frequency threshold, the maximum switching frequency threshold, number of the detected valleys, and switching operation mode from the quasi-resonant mode and the forced switching frequency mode is controlled according to at least one parameter of the power converter.

3. The method of claim 2, wherein the parameter(s) of the power converter include(s) at least one of load conditions and feedback conditions of the power converter.

4. The method of claim 1, wherein the power converter is operated in an additional operation mode other than quasi-resonant mode and forced switching frequency mode dependent on at least one load condition of the power converter.

5. The method of claim 4,
   wherein the at least one load condition is represented by a valley number n and n is compared to at least one threshold valley number, wherein the valley number n represents a number of the detected valleys; and
   wherein the operation mode is changed when the valley number n exceeds or falls below the at least one threshold valley number.

6. The method of claim 4, wherein the additional operation mode is a burst mode.

7. The method of claim 2, wherein in the forced switching frequency mode a switching frequency of the power converter is constant and a peak primary current of the power converter is variable.

8. The method of claim 2, wherein in the forced switching frequency mode a peak primary current of the power converter is constant and a switching frequency of the power converter is variable.

9. The method of claim 1, wherein the power converter is switched according to a pulse width modulation scheme.

10. The method of claim 4, wherein in the additional operation mode the power converter is switched according to a pulse width modulation scheme.

11. A switched-mode power converter, which is operable to convert an input voltage and a primary current into an output voltage and a secondary current, comprising:
   a controllable switching element configured to operate at a switching frequency; and
   a switch control unit comprising a look-up table and configured to control the controllable switching element; the switch control unit further configured to:
   receive at least one of a defined minimum switching frequency threshold and a defined maximum switching frequency threshold;
   detect valleys occurring in a voltage over the controllable switching element when the controllable switching element is in an off-state;
   generate from a signal representing the output voltage of the power converter a peak current threshold and a switching time signal representing a switching time period using the look-up table; and
   control the controllable switching element based on the detected valleys, the peak current threshold and the switching time signal to either
      in a quasi-resonant mode, switch the controllable switching element on when an nth consecutive valley occurs, n being an integer and equal to or greater than one, and to switch the controllable switching element off when the peak current threshold is reached by the primary current of the power converter so that the switching frequency is at least one of: below the maximum switching frequency threshold and above the minimum switching frequency threshold; or
      in a forced switching frequency mode, switch the controllable switching element on for the switching time period so that the switching frequency is the maximum or the minimum switching frequency.

12. The power converter of claim 11, wherein the at least one of the minimum switching frequency threshold, the maximum switching frequency threshold, number of the detected valleys, and switching operation mode from the quasi-resonant mode and the forced switching frequency mode is controllable according to at least one parameter of the power converter.

13. The power converter of claim 12, wherein the parameter(s) of the power converter include(s) at least one of load conditions and feedback conditions of the power converter.

14. The power converter of claim 11, wherein the power converter is configured to be operated in an additional operation mode other than quasi-resonant mode and forced switching frequency mode dependent on at least one load condition of the power converter.

15. The power converter of claim 14,
   wherein the at least one load condition is represented by valley number n and n is compared to at least one threshold valley number, wherein the valley number n represents a number of the detected valleys; and
   wherein the power converter is configured to change its operation when the valley number n exceeds or falls below the at least one threshold valley number.

16. The power converter of claim 14, wherein the additional operation mode is a burst mode.

17. The power converter of claim 12, wherein the power converter is configured in the forced switching frequency mode to keep the switching frequency constant and to vary a peak primary current.

18. The power converter of claim 12, wherein the power converter is configured in the forced switching frequency mode to keep a peak primary current constant and to vary the switching frequency.

19. The power converter of claim 11, wherein the power converter is configured to switch according to a pulse width modulation scheme.

20. The power converter of claim 14, wherein in the additional operation mode the power converter is configured to switch according to a pulse width modulation scheme.

21. A non-transitory computer-readable storage medium storing computer-executable instructions that, in response to execution, cause a processing component to:
store at least one of a minimum switching frequency threshold and a maximum switching frequency threshold;
detect valleys occurring in a voltage over a switching element when the switching element is in an off-state;
generate from a signal representing an output voltage of a power converter a peak current threshold and a switching time signal representing a switching time period using a look-up table; and
control the switching element based on the detected valleys, the peak current threshold and the switching time signal to either
in a quasi-resonant mode, switch the switching element on when an nth consecutive valley occurs, n being an integer equal to or greater than one, and to switch the switching element off when the peak current threshold is reached by a primary current of the power converter so that the switching frequency of the switching element is at least one of: below the maximum switching frequency threshold and above the minimum switching frequency threshold, or
in a forced switching frequency mode, switch the switching element on for the switching time period so that the switching frequency is the maximum or the minimum switching frequency.

22. The non-transitory computer-readable storage medium of claim 21, wherein the at least one of the minimum frequency switching threshold, the maximum switching frequency threshold, number of the detected valleys, and switching operation mode from the quasi-resonant mode and the forced switching frequency mode is controlled according to at least one parameter of a power converter.

23. The non-transitory computer-readable storage medium of claim 22, wherein the parameter(s) of the power converter include(s) at least one of load conditions and feedback conditions of the power converter.

24. The non-transitory computer-readable storage medium of claim 21, wherein a power converter is operated in an additional operation mode other than quasi-resonant mode and forced switching frequency mode dependent on at least one load condition of the power converter.

25. The non-transitory computer-readable storage medium of claim 24,
wherein the at least one load condition is represented by a valley number n and n is compared to at least one threshold valley number, wherein the valley number n represents a number of the detected valleys; and
wherein the operation mode is changed when the valley number n exceeds or falls below the at least one threshold valley number.

26. The non-transitory computer-readable storage medium of claim 24, wherein the additional operation mode is a burst mode.

27. The non-transitory computer-readable storage medium of claim 22, wherein in the forced switching frequency mode a switching frequency of the power converter is constant and a peak primary current of the power converter is variable.

28. The non-transitory computer-readable storage medium of claim 22, wherein in the forced switching frequency mode a peak primary current of the power converter is constant and a switching frequency of the power converter is variable.

29. The non-transitory computer-readable storage medium of claim 21, wherein a power converter is switched according to a pulse width modulation scheme.

30. The non-transitory computer-readable storage medium of claim 24, wherein in the additional operation mode the power converter is switched according to a pulse width modulation scheme.

* * * * *